United States Patent
Golicz et al.

(10) Patent No.: US 7,176,799 B1
(45) Date of Patent: Feb. 13, 2007

(54) ASSEMBLING PRESSURE SENSITIVE LABELS WITH RFID TAGS

(75) Inventors: Roman M. Golicz, Clinton, CT (US); William G. Gunther, Guilford, CT (US)

(73) Assignee: George Schmitt & Company, Guilford, CT (US)

( * ) Notice: Subject to any disclaimer, the term of this patent is extended or adjusted under 35 U.S.C. 154(b) by 110 days.

(21) Appl. No.: 11/006,361

(22) Filed: Dec. 6, 2004

Related U.S. Application Data

(60) Provisional application No. 60/526,086, filed on Dec. 4, 2003.

(51) Int. Cl.
 *G08B 13/14* (2006.01)
(52) U.S. Cl. .............................. 340/572.1; 340/572.8; 156/64; 400/621
(58) Field of Classification Search ............. 340/572.1, 340/572.4, 572.6, 572.7, 572.8; 156/64, 156/263, 264, 290, 300, 301, 731; 400/621
See application file for complete search history.

(56) References Cited

U.S. PATENT DOCUMENTS

| | | | |
|---|---|---|---|
| 6,280,544 B1 * | 8/2001 | Fox et al. ...................... 156/64 |
| 6,357,503 B1 | 3/2002 | Kromer et al. .............. 156/351 |
| 6,451,154 B1 * | 9/2002 | Grabau et al. ............... 156/300 |
| 6,645,327 B2 * | 11/2003 | Austin et al. .................. 156/64 |
| 6,695,501 B2 * | 2/2004 | Nedblake et al. ........... 400/621 |
| 6,827,817 B2 * | 12/2004 | Bleckmann et al. ........ 156/73.1 |
| 7,014,729 B2 * | 3/2006 | Grabau et al. .............. 156/290 |
| 2003/0089444 A1 | 5/2003 | Melzer et al. ................. 156/64 |

OTHER PUBLICATIONS

"RFID: The Qualified Manufacturing Process" Bielomatik Levze' GmbH website pages (Dec. 2-4, 2003) 7 pages.

* cited by examiner

*Primary Examiner*—Van T. Trieu
(74) *Attorney, Agent, or Firm*—C Nessler

(57) ABSTRACT

Radio Frequency Identification (RFID) tags are adhered to the underside of sheet labels, to form assemblies which can be applied to articles. Pressure sensitive adhesive labels are removed from a liner which then runs on a loop, back to nip rollers, where the labels are re-attached to the liner. The labels are re-attached at a downstream point on the liner, in combination with tags, to form the assemblies. The assemblies on the moving assembly web are read by optical and radio frequency systems; and, defective assemblies are removed by a diverter which strips the selected defective assembly from the web and carries it away on a defect liner. RFID tags are adhered to linerless label web at spaced apart locations, to form assemblies which can be cut from the web at the point of application.

18 Claims, 8 Drawing Sheets

ASSEMBLING PRESSURE SENSITIVE LABELS WITH RFID TAGS

This application claims benefit of provisional patent application Ser. No. 60/526,086, filed Dec. 4, 2003.

TECHNICAL FIELD

The present invention relates to means for identifying goods, in particular to means by which Radio Frequency Identification (RFID) tags are combined with optically readable sheet labels.

BACKGROUND

Radio Frequency Identification (RFID) systems comprise tags having thin micro-circuit units with associated antennae. RFID tags may be passive, in that they respond in some fashion to external radio signals, or they may be active, typically in that they are battery powered. The tags have the capacity to provide unique radio signals when interrogated by an appropriate transceiver of the RFID system.

RFID technology is becoming widely used to identify and control the flow of goods, for instance, to identify packages or pallets which are moved in warehouse operations. RFID tags heretofore have been applied to goods in various ways. They may be glued to the article surface, taped, or otherwise merged into the product itself. A typical RFID tag is in the form of a sheet, comprising a flat antenna printed on plastic or paper film and a small micro-processor, or chip, attached to the antenna. A typical tag with pressure sensitive adhesive may be about 0.13–0.15 mm thick at the antenna about 0.3 mm thick at the chip location.

In many instances, it is desirable also to use RFID tags in combination with a label or other marking which is optically readable, by machine means or by human eye, or both, such as would be given by a printed paper or plastic label bearing a bar code. A typical paper or plastic sheet label with pressure sensitive adhesive is about 0.09 mm thick.

A common way of approaching the task of applying a RFID tag with an overlying sheet label to mass production goods, such as molded glass or plastic containers for pharmaceuticals and the like, is to make up an assembly of tag and label, and to then use common bottle labeling equipment. However, the presence of the RFID tag presents special needs. First, the RFID tag is an electronic device and can not be mishandled. Second, the RFID tag must be reliably placed, along with the label. Third, the correlation between the markings on the label and the signature or identification of the RFID tag should be established and verified. The latter is particularly important when the distribution and use of the product is constrained, as is the case for controlled substances (drugs, etc.). There has to be tracking of the RFID tags and labels and means to ensure un-recorded loss of RFID or labels occurs.

SUMMARY

An object of the invention is to assemble RFID tags and pressure sensitive labels, to form assemblies which are accurately located relative to one another, for application onto a product. A further object is to inspect and test and validate tags, and assemblies of labels and tags, on a continuous basis; and to remove from webs those components which are defective or do not meet predetermined criteria.

In accord with embodiments of the invention, pressure sensitive labels and RFID tags are provided on liners. Labels are serially stripped from the liner. The cantilevered leading edge or each label is delivered to the nip of a nip roller pair or other pressing means. The emptied portion of the label liner runs on loop path, away from the label removal location, i.e., in proximity of the nip rollers, to return to the nip rollers and pass through the nip. The labels are re-adhered to the returning liner, as it enters the nip. There is thus a gap between the point where the labels are removed and the liner runs away, and the point where it returns and runs over a roller of the nip roller pair. Tags, when supplied in tag web form, are also serially stripped from the tag liner and cantilevered through the said gap into the nip, so they also engage the empty returning liner part, or so they engage the adhesive underside of a label entering the nip. The tags are delivered in time coordinated fashion with the labels, so that, as the tag and label pass through the nip, each label overlies a tag on the original label liner, to form a tag and label assembly. A multiplicity of assemblies on a liner is called an assembly web.

In accord with an embodiment of the invention, the assembly web coming from the nip rolls is moved past apparatus which determines the functionality and data of the RFID tags by radio frequency means, and reads information on the label by optical or vision system means, and compares the information to criteria in a data base or checks that the RFID tag coordinates with the label. If tags or assemblies are found to be defective, defective assemblies are removed from the assembly web by a diverter. The diverter has a defect liner to receive defective assemblies. The defect liner runs along the underside of the tip of a pivoting beam or a substitutional roller or other device, in the opposing direction to the web, as the tip depresses the web so it bends around a stripping post. The depressing causes a defective assembly to start to strip from the now-bent web and the assembly contacts the defect liner which is running around the beam tip. The assembly becomes adhered to the discard liner and is carried away by it.

In further accord with an embodiment of the invention, RFID tags having pressure sensitive coating on one side are attached to the adhesive side of a linerless label web, which has printed labels and a release coating on the opposing side, so the adhesive surfaces of the tag and web face in the same direction. The resultant assembly can be wound on a reel, and at the point of application to a product, the label web is separated into individual labels, each having an RFID tag.

The foregoing and other objects, features and advantages of the present invention will become more apparent from the following description of preferred embodiments and accompanying drawings.

DESCRIPTION

Figure 1:
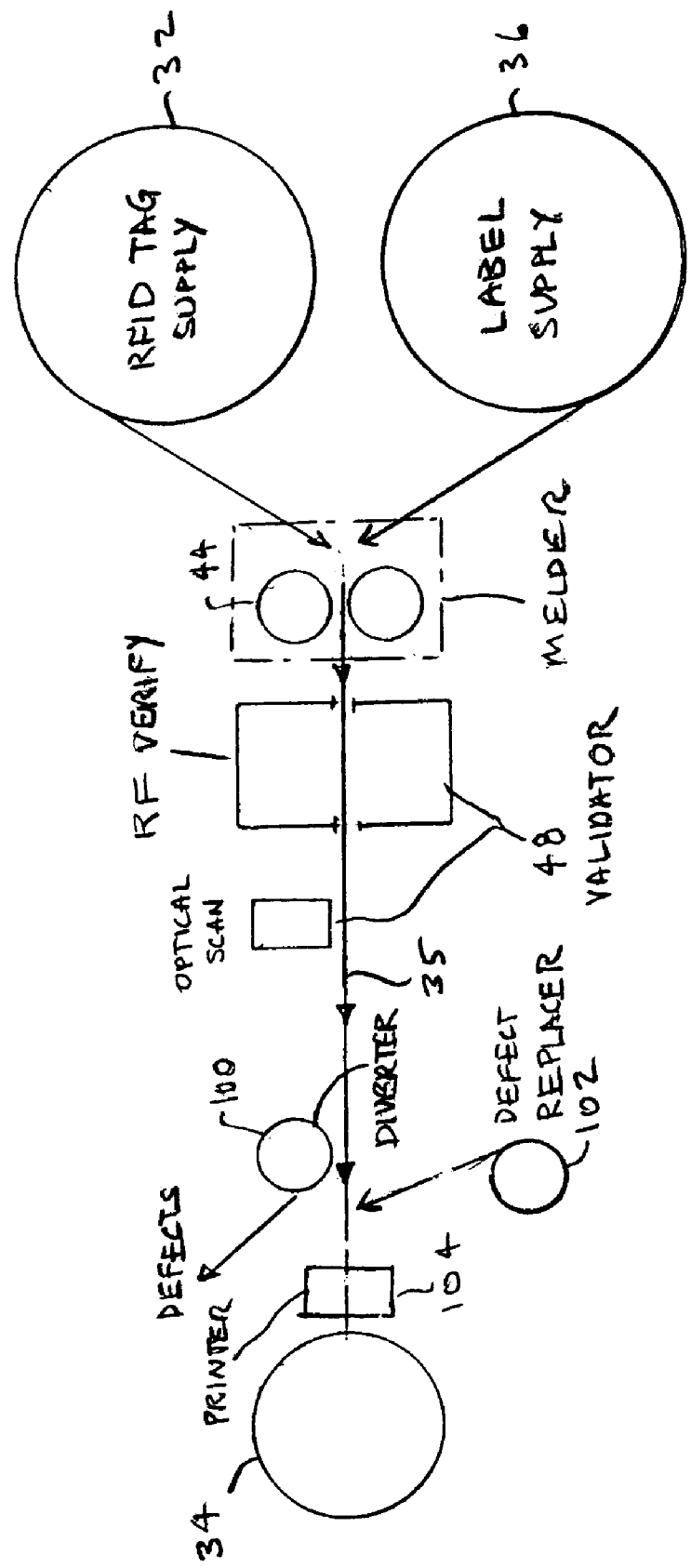
FIG. 1 schematically illustrates the interrelated parts of apparatus of the invention.

In an embodiment of the present invention, RFID tags are provided as small plastic film pieces coated with pressure sensitive adhesive. They are integrated with printed paper or plastic labels having pressure sensitive adhesive, to form assemblies, which are then stored on a reel or the like, for delivery to those who apply them to containers and the like. FIG. 1 schematically illustrates how the several components of a preferred embodiment system of the present invention interrelate. Tags and labels from supply sources 32, 36, such as reels, are mated in a region of the apparatus called the melder, which preferably comprises nip rollers 44, to form assemblies which are pressure-sensitive adhered to the same liner on which the labels were originally mounted. The assembly web then passes through a RF and optical validating system 48. Defective or bad assemblies which are found in the validating system are removed from the web by the diverter 100. The spaces left on the web by discarded assemblies are then optionally filled with replacement good assemblies.

Figure 2:
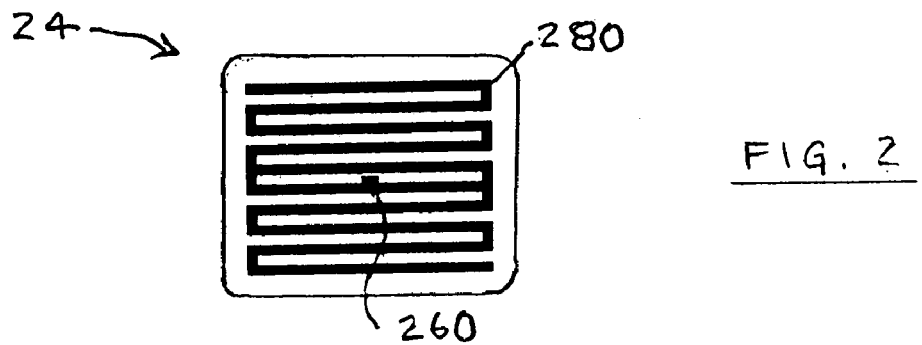
FIG. 2 is a plan view of a RFID.

FIG. 2 shows a typical radio frequency identification device (RFID) transponder, or tag 24, which comprises a micro-chip 260 is attached to a zig-zag metal or carbon antenna 280, all mounted on a piece of plastic film. The rectangular chip may be about 2 mm in each flat plane dimension, while the antenna may be about 2.5 cm. Smaller and larger antennae/tags are common. The tags are commonly supplied spaced-apart on a discardable film or liner, to which they are attached by pressure-sensitive adhesive. That combination is referred to here as tag web. Labels are mounted likewise on a liner, and the combination is referred to here as label web. (Continuous tags and linerless labels are discussed later.) A liner having a multiplicity of assemblies, each comprised of a label underlying tag, adhered to the liner, is referred to here as an assembly web.

Figure 3:
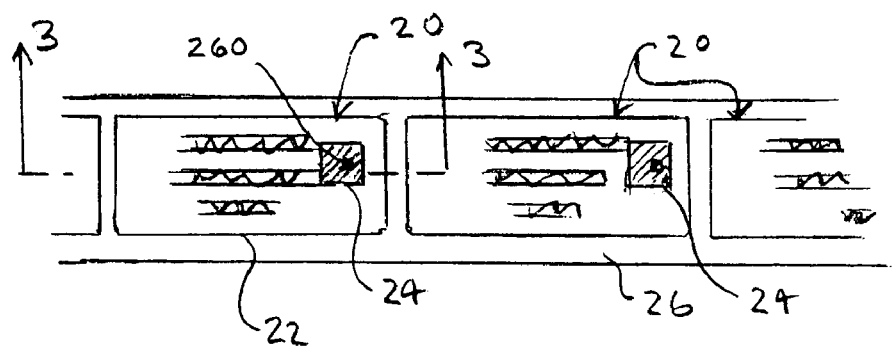
FIG. 3 is a top view of a label and RFID tag assembly on a liner.
Figure 4:
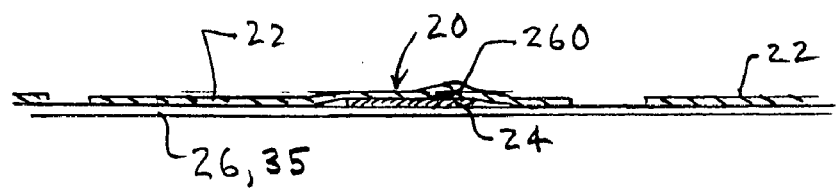
FIG. 4 is a cross section elevation view of a tag and label assembly shown in FIG. 3.

FIGS. 3 and 4 are respectively top and side cross section views of an assembly web, the formation of which is an object of the invention. The assembly 20 of tag 24 and label 22 is mounted on liner 26. The pressure sensitive adhesive of the label holds the tag securely in place. Typically, the tag also has pressure sensitive adhesive on the face which contacts the liner. In the generality of the invention, tags may be without adhesive, since a tag which is substantially smaller than the label can be overlaid by, and captured on the liner, and later on the product, by the label.

Figure 5:
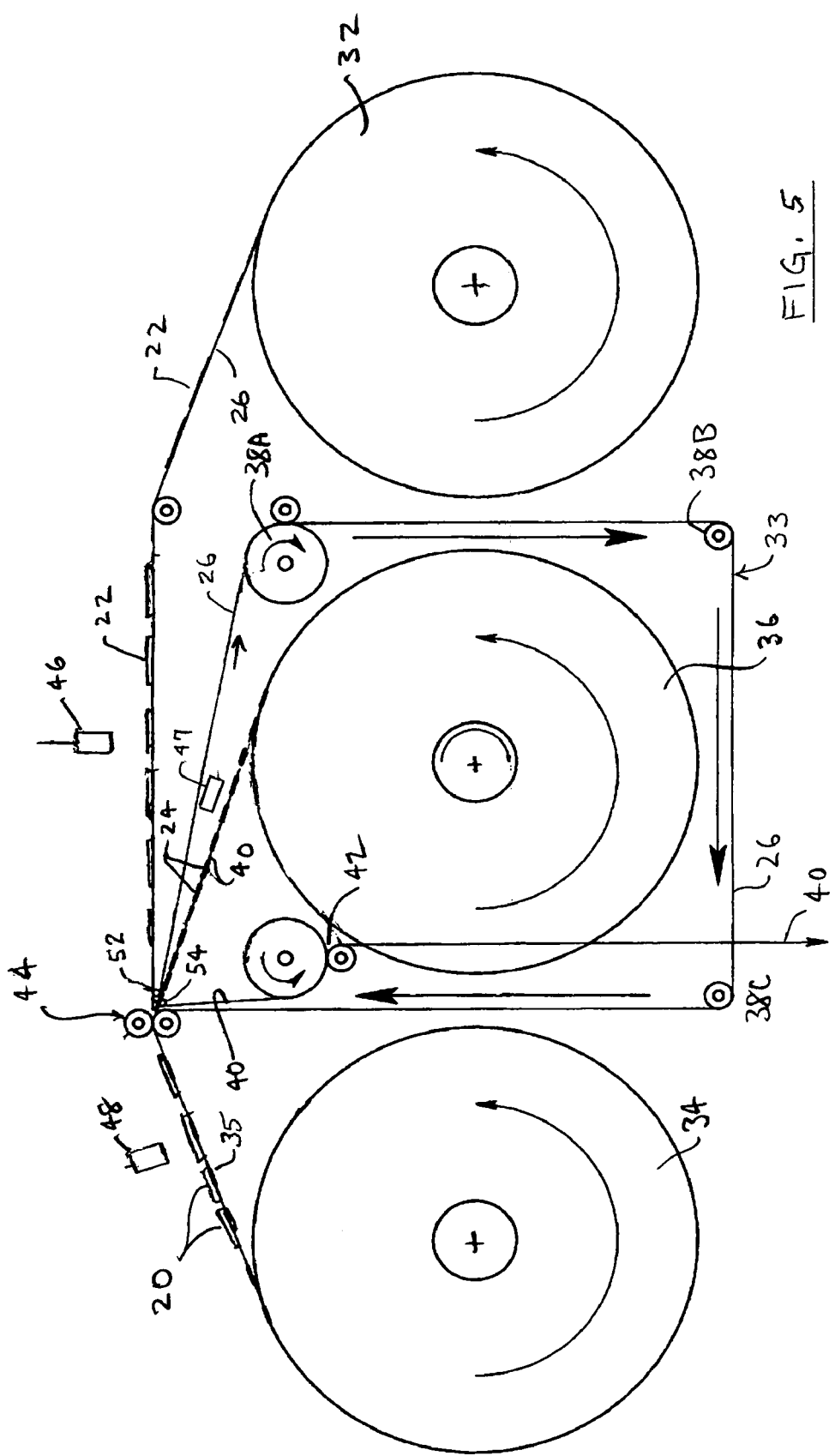
FIG. 5 is a schematic side elevation view of apparatus which forms label and tag assemblies.
Figure 6:
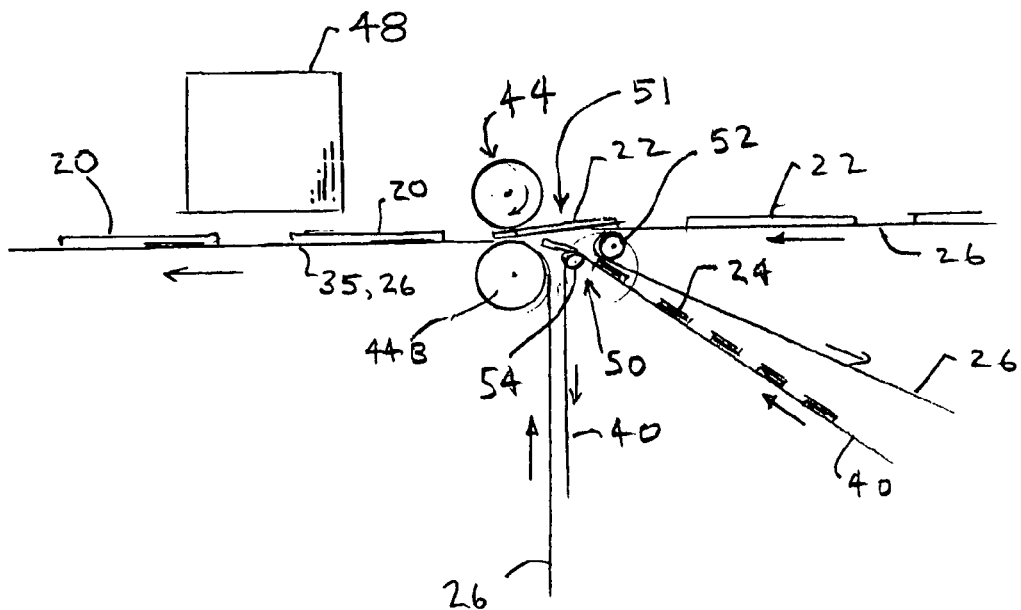
FIG. 6 is a more detailed side elevation view of the part of the apparatus of FIG. 4.

FIGS. 5 and 6 show in elevation and partial schematic form how label assemblies 20 are formed. Both the labels and the tags are stripped from their respective liners so they can be re-combined on the liner previously occupied only by labels. The resultant assembly web can be received on a reel or other storage device for later use; alternately, assemblies may be applied directly to a product.

Spaced apart pressure sensitive labels 22, attached to label liner 26, are provided as a label web from pay-off reel 32 or other supply device. The label web is drawn to upstream vicinity of nip roller pair 44 by unshown drivers of the rollers 44. Just upstream of the nip of the roller pair 44, liner 26 is bent around a sharp curved edge or small roller 52, to separate by stripping each label 22 from the liner 26. The cantilevered leading edge of each label 22 which is being stripped bridges the gap 51 between roller 52 and the nip of rollers 44, so its leading edge enters the nip of rollers 44.

The liner 26 then follows a circuitous loop path 33 away from the vicinity of the roller pair 44, so it can return and be recombined with the label and tag at the nip roll set 44. More specifically, the loop path of now-empty liner 26 circumscribes the location of tag reel 36 by running around rollers 38A, 38B, and 38C. The liner comes back to vicinity of the nip roll set, and then enters nip roll pair 44 along with the label and tag, as next described. The empty liner may be run along other shorter or longer paths. There is a gap 50 between point where the liner runs away from vicinity of the nip roll set, and the point where the liner returns, i.e., between roller 52 and roller 44B, shown in FIG. 6.

RFID tags 24 on a tag web, wherein the tag are adhered by pressure sensitive adhesive to liner 40, are fed from reel 32 to vicinity of nip roll set 44 and gap 50. Each tag is stripped from the liner 40 and delivered into the gap region 50. This is done by running the tag web around small roll 54 or a substitutional narrow rounded edge, which is positioned sufficiently close to the nip of rollers 44, so that the cantilevered leading edge of the tag is adhesively engaged with the liner 26 or the underside of a label 22. The emptied liner 40 runs on a path away from vicinity of the nip roll set 44, to a point where is it received for discard.

The cantilevered leading edge of each label approaches the nip of rollers 44 and the label pressure sensitive surface engages with returning liner 26 as it runs over the lower roller of the set 44. Simultaneously, a tag 24, being likewise stripped and cantilevered toward the nip, is delivered in time-coordinated fashion to the nip of rolls 44, so the tag enters the nip along with the label, to contact and adhere to liner 26 or a label 22 as either runs over the lower roll, and so it is enveloped and overlaid by the label. It will be understood by the artisan how the forgoing steps are accomplished by powering the various rollers and or reels. Likewise, conventional electronic control and power systems, including processors, timing devices, location detectors, encoders, servo motors, drivers and the like, are used to coordinate the delivery of each label and tag and to achieve the desired motions just described. While reels are described as the means by which webs are supplied and taken up, other known means, for instance, fan-folding, may be used for supply and storage, in association with feed and take up rollers, as needed.

Figure 7:
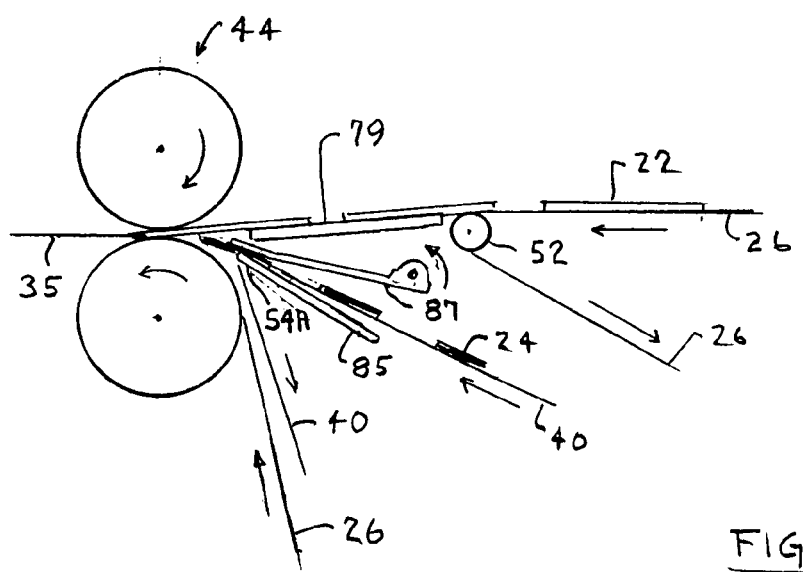
FIG. 7 is a still more detailed view, like FIG. 6.

FIG. 7 is a still more detail view of melder components which could not be shown in the previous drawings. Guide 79 is a corrugated piece of metal, where the length of the peaks and valleys run in the direction of the travel path of labels 24, so the label only rides on the peaks as support points. Alternately guide 79 comprises a series of spaced apart rods running along the label travel path. Generally, guide 79 comprises spaced apart linear support members. Tags are stripped from liner 40 by the tip 54A of fixed blade 85. Rotationally spring-biased plate 85 presses down toward tip 54A on the tags being stripped to help guide them into the nip of rollers 54. Optionally, other intermediate transport devices, such as continuous loop belts running on spaced apart rollers, may be interposed between the point of stripping and the nip of the rollers 44, if desired to shorten the cantilever distance and to better deliver tags or labels to the nip.

Figure 13:
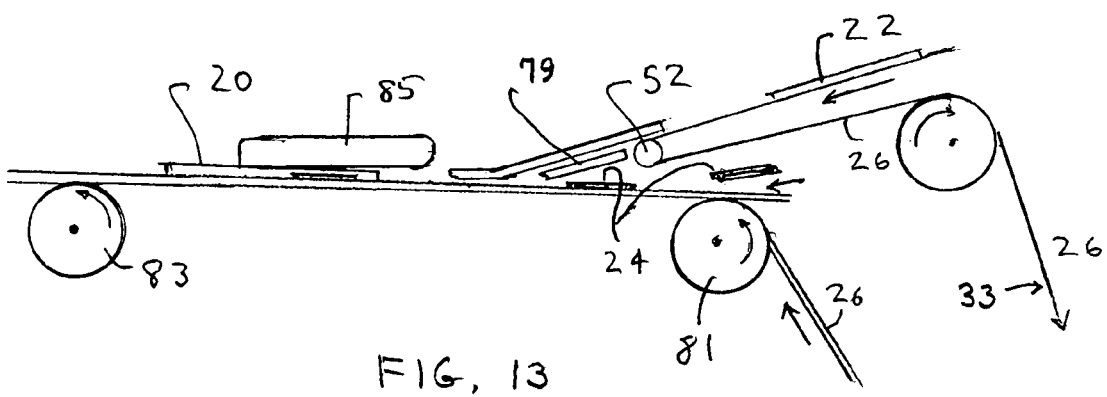
FIG. 13 shows in side elevation apparatus of the kind shown in FIG. 5, wherein the means for pressing a label on a tag is a pressure plate instead of nip rollers.

Thus, each label is re-adhered to the liner with a tag captured beneath it. Over time, there is a multiplicity of assemblies 20 mounted on liner 26, and that makes up assembly web 35. The assembly web is received on take up reel 34 or some other device. The process of integrating a label and tag to form an assembly is here called melding. The mechanism which receives in different ways described herein, and which then presses the label, tag, and liner together is here called a melder. Other devices known in the art, other than the preferred roller pair 44, which receive and press the label and tag together and move them downstream, may be used. For instance, opposing belts may be used. For instance, the pressure plate 85 shown in FIG. 13 may be used. The term nip rollers in the claims will be understood to comprehend such equivalent devices. Nip rollers are preferably powered, but other rollers or belts may be used downstream of the nip rollers, to move the assembly web downstream.

Figure 11:
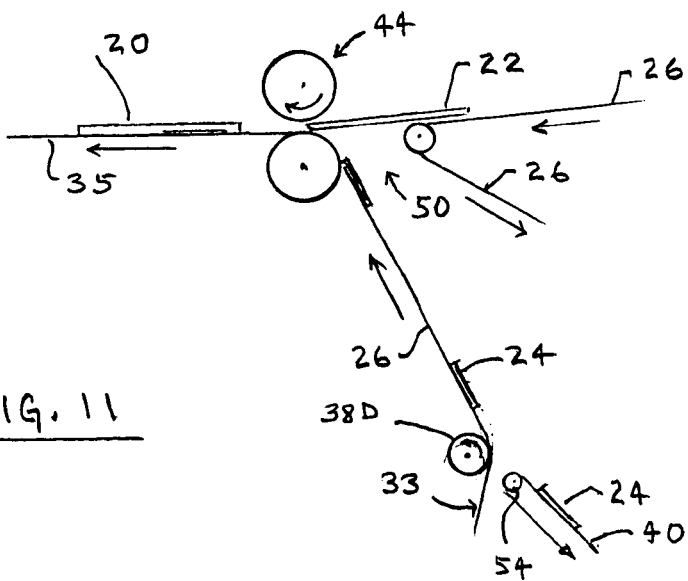
FIG. 11 is a variation of the apparatus of the kind shown in FIG. 5, wherein tags are deposited on the liner upstream of the melder nip.

So, it is seen how each label is removed from the liner at a first location along the length to the liner, and then reattached to the liner at a different location further downstream along the liner length as tags are delivered to the point of re-attachment. In the FIG. 6 embodiment, the tags are deposited onto liner 26 by passing through gap 50. In a variation shown in FIG. 11, tags are also passed through gap 50, but are adhered to liner 26 along the loop path 33, e.g., at the location of additional loop roller 38D, where the end roller 54 of the tag stripper is relocated. Gap 50 is the space between the point where labels are stripped from the liner, and the point where the emptied liner portion returns to vicinity of the rolls 54. The timing, and thus the spacing, of the deposit of tags 24 on liner 26 is coordinated with the timing of feeding of labels onto the liner at the entry to rollers 44.

In a variation, tags may be provided as continuous webs with no liner and no adhesive, and may be coated with an adhesive as the web issues from tag reel 36, after which they are severed and merged with the label in the melder region. This is described below in conjunction with the use of linerless labels. In a further variation, tags are provided as separate pieces in a stack, rather than on a reel, and a commercial device or small robot is adapted to pick up tags and insert them into the gap 50 and the roller nip. In such case the length of the empty label liner loop can be quite short.

Figure 12:
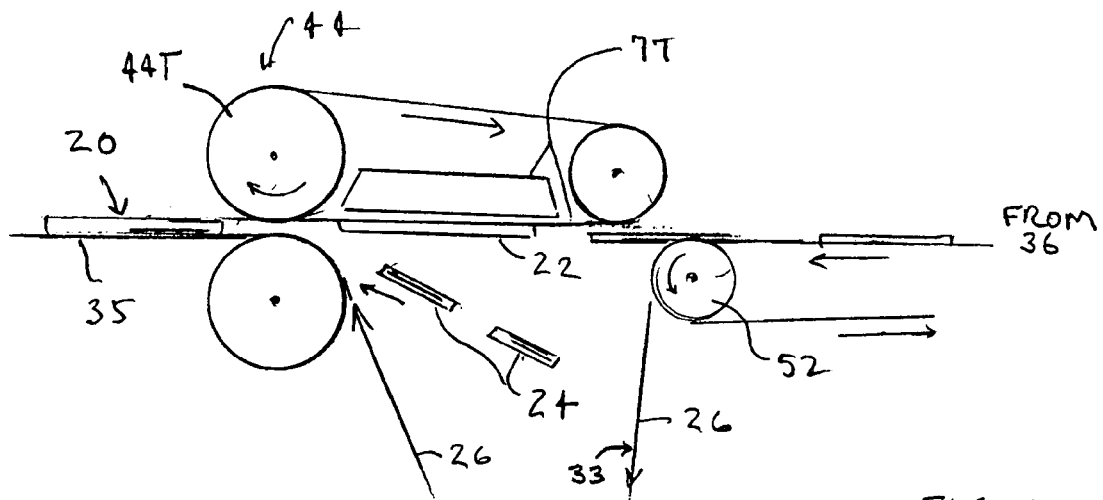
FIG. 12 shows in side elevation a variation on apparatus of the kind shown in FIG. 5, wherein a vacuum belt transports labels from the stripper to the nip rollers nip, and where unlined tags are fed into the roller nip by a robot.

In an alternate embodiment, illustrated by FIG. 12, labels 22 are stripped from the liner 26 which then runs on a loop path as previously described. But instead of cantilevering the leading edge of the label through space, the label is captured by a vacuum belt 77 which runs between idler roller 79 and the upper roller 44T of the nip roller set 44.

While nip rollers are preferred, other means may be used for pressing the label and tag together onto the liner. For example, in the alternate embodiment shown in FIG. 13, the labels are stripped from the liner 26, and then re-attached as it returns along loop 33, while the liner runs in taut fashion across a gap from idler roller 81 to idler roller 83. The labels and tags are laid in coordinated fashion on the unsupported surface of the liner. Each assembly of label and tag is pressed together and onto the liner when the liner passes under pressure plate 85. FIG. 13 also shows again the use of a label guide 79 which helps carry the leading edge of the label onto the liner.

Apparatus 46 and apparatus 47, schematically illustrated, may be used to accomplish actions relating to inspecting, verifying, recording—generally here referred to as validating, of labels, tags and the assemblies. For instance, apparatus 46 may be a sensor for inspecting the quality of the ink and printing, particularly if the ink is optically active, as labels 22 approach the gap 50. Likewise one or more sensors 47 may be used to read, and to test, tags 24 with respect to identification and radio wave properties, as they approach the gap. Such apparatus 47 may be based on a transceiver of the type normally employed in RFID systems, or it may the apparatus of the Bosco et al. application, mentioned below.

Alternately, or in addition, apparatus 48, here called a validating system, may be used to inspect and test the tags with respect to performance and identity, and to verify that such information correlates with printed information on the label. Optionally, a data base is compiled and compared to pre-existing data base information, for verification purposes. Apparatus 48 may include common commercial vision or image reading optical equipment for seeing and reading information on the label, e.g., a bar code. Commercial RFID reading equipment may be used as part of apparatus 48. Preferably, RFID tag functionality and data are evaluated by radio frequency electromagnetic transmission using means and methodology, including short range and long range radio frequency antennae, which are described in commonly assigned patent application Ser. No. 10/947,752 entitled "System and Method for Validating Radio Frequency Identification Tags", filed on Sep. 23, 2004 by E. Bosco et al., the disclosure of which is hereby incorporated by reference. Said separately disclosed apparatus and process involves ensuring RFID function, ascertaining RFID information content, and storing or comparing information. For example, the identification of the RFID is compared to a data base of acceptable numbers, and identification of the RFID is compared to the unique identification information on the label, for instance a bar code. The process, or any step or sub-combination, is referred to here as validating. A printer, not shown, may be immediately downstream of apparatus 48, for printing bar code or other information on the label responsive to data by apparatus 48.

Figure 14:
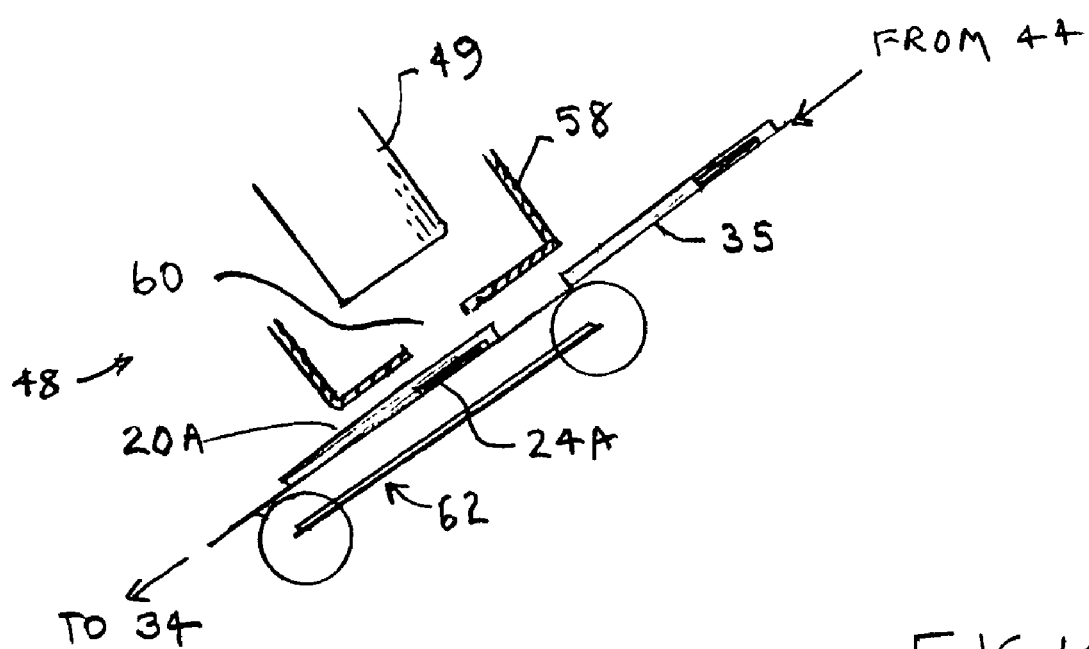
FIG. 14 shows an embodiment of the validation part of the FIG. 4 apparatus.

Another embodiment of validating apparatus 48 is illustrated by FIG. 14. RFID transceiver 49 is positioned behind the small window 60 of electromagnetic shield 58, which limits transmission of electromagnetic waves to and from a specific tag 24A. Thus the transceiver looks at the tag of any label assembly when the label assembly 20A is momentarily stopped for a fraction of a second. The momentary stopping may be accomplished by using an orbital roller system of the type described in Brining U.S. Pat. No. 5,373,761, schematically illustrated by the dumbbell shaped item 62 in FIG. 7. The disclosure of the patent is hereby incorporated by reference. Substitutional prior art systems which achieve the same result may be employed.

As a result of the validating process certain tags may be found defective, either functionally, or because the identification number does not correspond with a reference data base. Or, the identifications of the tag and label of a particular assembly may not be matched correctly. Thus, it becomes desirable to remove such defective or bad assemblies from the web. With reference again to FIG. 1, a means 100 to do that, here called a diverter, may be provided downstream from validator 48 and is described next. And, optionally means 102 may be provided further downstream, for replacing the defective assemblies which have been discarded. A commercial printer 104 may be provided for printing reference identification information on the liner, if that is desired for control purposes.

Figure 8:
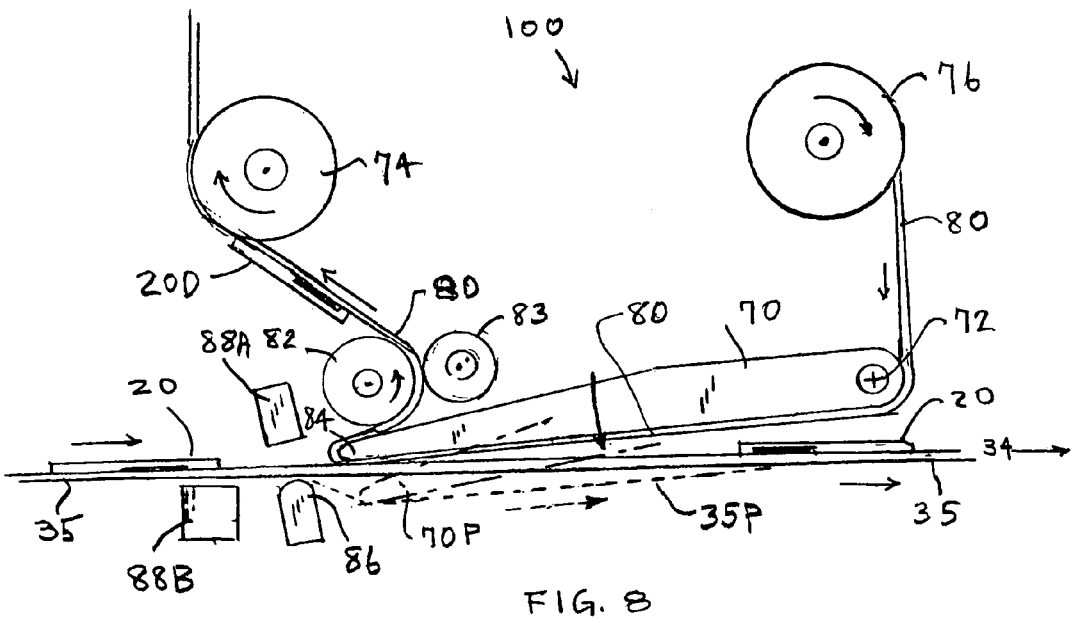
FIG. 8 is a side elevation view of the diverter part of the apparatus illustrated by in FIG. 1.
Figure 9:
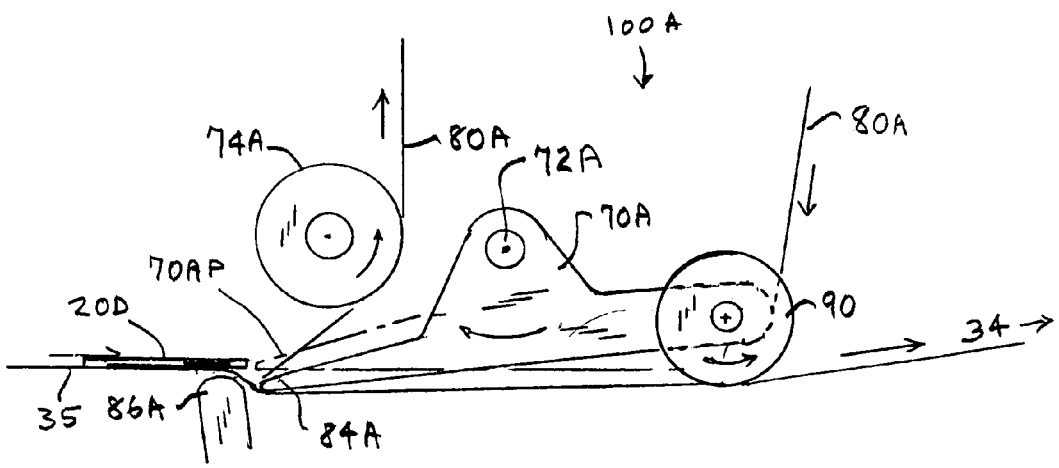
FIG. 9 is a simplified view similar to FIG. 9, showing an alternative diverter.
Figure 10:
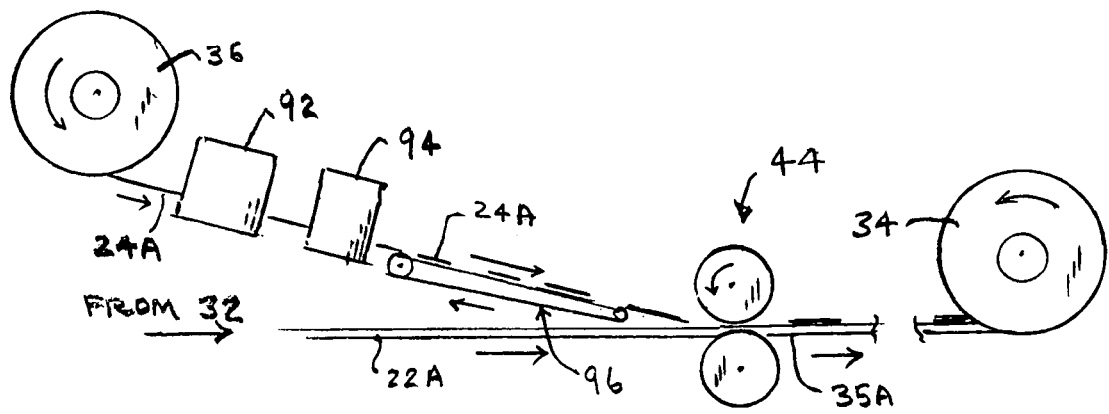
FIG. 10 is a simplified side elevation view of apparatus for making assemblies from linerless label web and continuous RFID tag strip.

A first example of diverter 100 is shown in the side elevation view of FIG. 8. In FIGS. 8–10, assembly web 35 is shown moving from left to right, in comparison to the direction in the previous drawings. A stripper beam 70 rotates through a small arc about pivot point 72. It is actuated by a solenoid or other actuator, not shown. The beam action control system has information from the validator 48 or is otherwise informed of the identity or location on the web of the defective assembly. The approach of the defective tag is signaled by sensor 88B, which may be a metal detector, to sense the presence of the RFID antenna of the assembly. In response to the signal from sensor 88B, the tip end 84 of beam 70 is moved downwardly as indicated by the arrow and the phantom beam 70P. The moving web is thus depressed and made to follow the path 35P. The resultant abrupt curving of the web over stripping post 86 or a substitutional roller causes the leading edge of an oncoming defective assembly to start to strip or separate from the web and head for the top surface of the tip 84 of the stripper beam 70. Also commanded by the control system, a defect liner 80 is drawn from reel supply 76, along the underside of the beam 70, being pulled along by and through drive roller 82 and associated pinch roller 83. The defect liner 80 runs around idler 74 to a discard point, which might be a reel or bin. Thus, the leading edge of the defective assembly, which is lifted up by the initiation of stripping action, attaches by pressure sensitive adhesive of the liner 80 as it moves away from the tip 84 and over the top of stripper beam 70. The defective assembly is thus carried away, as indicated by defective assembly 20D in the Figure. Optical sensor 88A senses the trailing edge of the defective assembly as it is pulled away by liner 80, and signals that the downward pivoting force on the beam 70 should be released. Aided by tension in web 35 or an unshown retractor, the beam returns it to its home position in timely fashion, sufficient to enable a good assembly immediately following the defective assembly to moves unhindered down the web path toward receiving point 34. In this embodiment, the increase in length of the path that the web has to travel due to action of the tip of the beam is provided when the intentionally limited torque of the driver of reel 34 is overcome.

FIG. 9 shows another embodiment or means for removing assemblies from the web, namely, diverter 100A. The numbers with suffixes identify components which correspond with the FIG. 8 embodiment. The stripper beam 70A, which pivots about an offset near-center point axle 72A, is shown in the position wherein it depresses the web 35 and receives a defective assembly. An assembly 20D is just starting to be stripped. Roller 90 is at the end of the beam opposite tip 84A. As shown, roller 90 rides on the web and presses in counterpoint to the tip 84A. So, when the beam moves to its rest position, shown by phantom beam 70AP, the roller presses down on the web. That pressing down is released when tip 84A is again pressed down on the web, to remove the next defective label. Thus, the need for increase in web length in vicinity of the diverter is compensated for by the raising up of the roller 90, and the operation is improved compared to the FIG. 8 embodiment. A separate roller which functions like roller 90, which is unattached to the beam but which is actuated to move like roller 90 in coordination with the beam action, may be employed with the FIG. 8 embodiment, or to substitute for the roller 90 in FIG. 9. Still other loop take up means may be employed, as are known in the art, to provide slack in the web.

While a beam is a convenient method of carrying out the discard process, other means for carrying out the step may be employed, in particular, to run the discard liner in the direction opposite to the web direction, and to have the discard liner contact the web while the web is being depressed. For instance, a vertically movable roller may substitute for tip 84 of the beam, and the discard liner may run directly from reel 76 to the underside of the substitute roller, and then to roller 82.

The diverters which have been just described may be used independently from the apparatus for assembling labels and tags, being described here. For instance, a diverter may be used to process assemblies or tags running from reel to reel past an inspection or interrogation point. For instance, the diverter may be used in other kinds of apparatus, and for removing assemblies or labels or tags from a web for purposes other than that they are defective.

Linerless labels and linerless RFID tags can be used together or with a lined other mating component. Linerless products are of interest because RFID tags might be damaged or disabled by sufficient frictionally generated electrostatic charges created during the separation of a liner from a label, tag or assembly. A solution to this is to eliminate the liner. Linerless components are also desirable from a waste management standpoint. As is well known, linerless labels comprise continuous sheets having adhesive on one side and printed labels with an overlying release coating on the opposing side. The labels are severed into individual pieces at the point of application to the product. A product having a linerless label with RFID tag will be different from a product having a lined label with RFID tag, in that the surface of the assembly opposite the surface to which the tag is attached has a silicone base or other kind or release coating, to which pressure sensitive adhesive adheres only lightly.

Thus, in the present invention, linerless label web can be substituted for the lined label web issuing from reel 32 in the apparatus of FIG. 5. Of course, there is no stripping of the labels from the web. The location of each printed label on the linerless web is sensed by commercial optical devices, and the tags are delivered to the nip rolls in coordination with such, so a tag underlies each label. The roll of set 44 which contacts the adhesive side of the web, as well as other rollers and surfaces in the apparatus which support the adhesive side of the web, may be appropriately coated to avoid adhesion problems due to contact of a roll with the pressure sensitive adhesive, as known in the art. Alternately the rolls may be cooled, as described the application referred to next. For an example of the technology relating to linerless labels and for handling webs of such, see commonly assigned and co-pending U.S. patent application Ser. No. 10/791,956 of Roman Golicz et al., entitled "Forming and applying linerless labels", filed Mar. 3, 2004, the disclosure of which is hereby incorporated by reference.

When making linerless label assemblies, the FIG. 5 apparatus and alternate embodiments may be used as shown. More preferably, the FIG. 5 apparatus is turned upside down, so the adhesive side of the linerless label web faces upwardly as it passes through the rolls 44, as illustrated by the simplified drawing of FIG. 10. The Figure also shows how tags 24A may be provided as a continuous plastic strip, without adhesive coating, from reel 36. The strip is passed through cutter 92 and adhesive coater 94, to emerge onto belt conveyor 96. The tags are stripped from belt 96 and deposited just upstream of the nip rollers 44 in spaced apart fashion, determined by printing on the linerless label web 22A. The tag adhesive side faces upwardly, as does the label web adhesive. The label and tags are pressed together in the nip rollers to form linerless assembly web 35A, which is optionally processed through the other parts of the system in FIG. 1 and received at storage reel 34. At the point of application to the end product, the assembly web 35A is cut into individual assemblies, in the same way as linerless web is cut into individual labels at the point of application. The uncoated surface of the tag adheres to the adhesive of the linerless label. The adhesive side of the tag will not adhere to the assembly web when it is wound on reel 34, due to the release coating on the printed side of the label web, and the selection of adhesive for the tag. While the defective assemblies of the linerless assembly web 35A can be identified by a validating system, at the present time there is no known means for removing such assemblies, as there is when the assemblies are on a liner, previously described. The apparatus may be used with tags supplied on and stripped from a liner, as previously described. The approach of coating and cutting tags from a continuous strip can be used with the lined label apparatus.

Although this invention has been shown and described with respect to one or more embodiments, it will be understood by those skilled in this art that various changes in form and detail thereof may be made without departing from the spirit and scope of the claimed invention.

We claim:

1. Apparatus for making a multiplicity of assemblies wherein each assembly comprises a tag with RFID means and a label, comprising:
   a supply of tags with RFID means;
   a supply of pressure sensitive adhesive coated labels in label web form, wherein labels are adhered to a liner;
   means for melding, by pressing together serially received labels and serially received tags, to form an assembly web in which each tag underlies a label adhered to said liner;
   means for serially removing each label from the label web at a first location upstream of the means for melding, and for delivering each label to the means for melding;
   means for running the label liner, after labels have been removed at the first location, along a loop path which runs to and through the means for melding; wherein there is a gap between said first location and the location where the label liner loop path runs to the means for melding;
   means for delivering each tag to the means for melding through said gap in coordination with the delivery of each label to the means for melding, so each label adheres to the liner by overlying a tag placed on the liner, thereby forming said assembly web; and
   means for moving said assembly web downstream from the means for melding.

2. The apparatus of claim 1 wherein said means for melding is a pair of nip rollers.

3. The apparatus of claim 1 wherein said supply of tags comprises tags which are adhered by pressure-sensitive adhesive coating to a tag liner, wherein tags are delivered by being serially stripped from the liner and cantilevered through space to contact the label liner as it enters the means for melding.

4. The apparatus of claim 1 wherein said supply of tags comprises tags which are pressure-sensitive adhesive coated; and, wherein the tags are adhered to the label liner running along the loop path at a point which is upstream of the point at which labels are re-adhered to the label liner.

5. The apparatus of claim 1 wherein labels are serially stripped from the label liner and cantilevered through space toward the means for melding.

6. The apparatus of claim 5 further comprising: a guide having a plurality of linear contact points, positioned between said first location and the entry to the means for melding.

7. The apparatus of claim 1 wherein the label web supply comprises a label web reel; wherein the tag supply comprises a tag reel; wherein the label web runs from the reel to said first location; and wherein said loop path of the liner circumscribes the tag reel location.

8. The apparatus of claim 1 further comprising: means for validating the assemblies on the assembly web, to identify defective assemblies, downstream of said means for melding.

9. The apparatus of claim 8 further comprising: means for removing defective assemblies from a moving web assembly web, located downstream along the assembly web from the validating means.

10. Means for removing articles from an article web, wherein articles are adhered to a liner by pressure sensitive adhesive, which comprises:
    means for moving the article web downstream past a means for pressing and an associated stripping post;
    means for pressing momentarily on the article-side surface of the article web, to depress the web, so the web contacts a stripping post;
    a stripping post, located on the opposing non-article side surface of the article web at a point along the article web path which is upstream from the point of contact of said means for pressing;
    wherein, when the means for pressing deflects the web, the web contacts the stripping post, to thereby change the shape of the article web path, sufficient to cause initiation of stripping of an article from the moving web;
    a defect liner, for receiving and carrying away articles stripped from the article liner;
    wherein the defect liner runs along the article web, and in direction opposite to the article web, at the point where the web is depressed by the means for pressing.

11. The apparatus of claim 10 wherein the means for pressing is the tip of a pivotable beam.

12. The apparatus of claim 11 wherein said tip is at a first end of said beam, wherein the beam is pivoted at a point between the first end and an opposing second end; further comprising: roller means mounted at said second beam end, for pressing on the web in alternation with the deflecting action of the first end of the means for pressing, so the length of the web path in vicinity of the diverter is not changed by the action of the means for pressing.

13. The apparatus of claim 10 further comprising movable means for depressing the web in alternation with and in direction opposite to the action of the means for pressing, so the length of the web path in vicinity of the diverter is not changed by the action of the means for pressing.

14. The apparatus of claim 13, wherein said means for moving includes a torque limited motor driven assembly web take up reel.

15. A method of making a multiplicity of assemblies, each assembly comprised of a tag with RFID means and a label, wherein pressure-sensitive coated labels are provided on a liner in the form of a label web, comprising:
    stripping labels serially from the label web, and delivering each stripped label to vicinity of nip rolls, so a portion of the label liner is emptied of labels;
    running the emptied part of the label liner, around a loop which runs to a point away from the nip rolls, and back and through the nip rolls;

wherein, each stripped label is serially re-adhered to the emptied label liner portion, as the liner runs to and through the nip rolls;

delivering tags serially to the vicinity of the nip rolls in coordination with the delivery of labels, so the re-adhered labels overlay the tags; and, passing the liner, tags and labels through the nip rollers, to thereby form said assemblies on an assembly web.

16. The method of claim 15 wherein the assembly web moves along a path downstream from the nip rolls to a take up, which further comprises:

validating the assemblies created at the nip rolls by means which includes radio frequency electromagnetic transmissions, downstream from the nip rollers, to identify defective assemblies; and, diverting defective assemblies from the assembly web, responsive to information obtained from the validating process, to thereby create empty spaces on the web.

17. The method of claim 16 which further comprises: printing information on the labels or the liner of the assembly web, downstream of the location where the defective assemblies are removed from the assembly web.

18. The method of claim 15 wherein tags are supplied as adhered by pressure-sensitive adhesive to a tag liner, which further comprises: stripping tags from the tag liner; and cantilevering the leading edge of each tag through space to contact the liner, to thereby deliver serially tags to vicinity of the nip rolls.

* * * * *